United States Patent

[11] 3,584,924

| [72] | Inventor | William E. O'Neill<br>Davisburg, Mich. |
|---|---|---|
| [21] | Appl. No. | 786,973 |
| [22] | Filed | Dec. 26, 1968 |
| [45] | Patented | June 15, 1971 |
| [73] | Assignee | Federal-Mogul Corporation<br>Southfield, Mich. |

[54] SEAL AND BEARING ASSEMBLY
5 Claims, 5 Drawing Figs.

| [52] | U.S. Cl. | 308/187.2 |
|---|---|---|
| [51] | Int. Cl. | F16c 33/78 |
| [50] | Field of Search | 308/187.1,<br>187.2, 181; 277/63, 58, 168; 308/31.1 |

[56] References Cited

UNITED STATES PATENTS

| 3,224,821 | 12/1965 | Barr | 308/187.2 |
|---|---|---|---|
| 3,140,129 | 7/1964 | Koss | 308/187.2 |
| 3,129,985 | 4/1964 | Watson | 308/187.1 |
| 3,006,701 | 10/1961 | Curtis | 308/187.1 |
| 2,712,966 | 7/1955 | Brady et al. | 308/181 |

FOREIGN PATENTS

| 675,146 | 7/1952 | Great Britain | 308/187.1 |
|---|---|---|---|
| 643,987 | 7/1962 | Canada | 308/187.1 |
| 617,513 | 2/1949 | Great Britain | 308/187.1 |

*Primary Examiner*—Martin P. Schwadron
*Assistant Examiner*—Frank Susko
*Attorney*—Harness, Dickey & Pierce

ABSTRACT: A bearing assembly including a grease seal for keeping lubricant in and a seal for keeping dirt out.

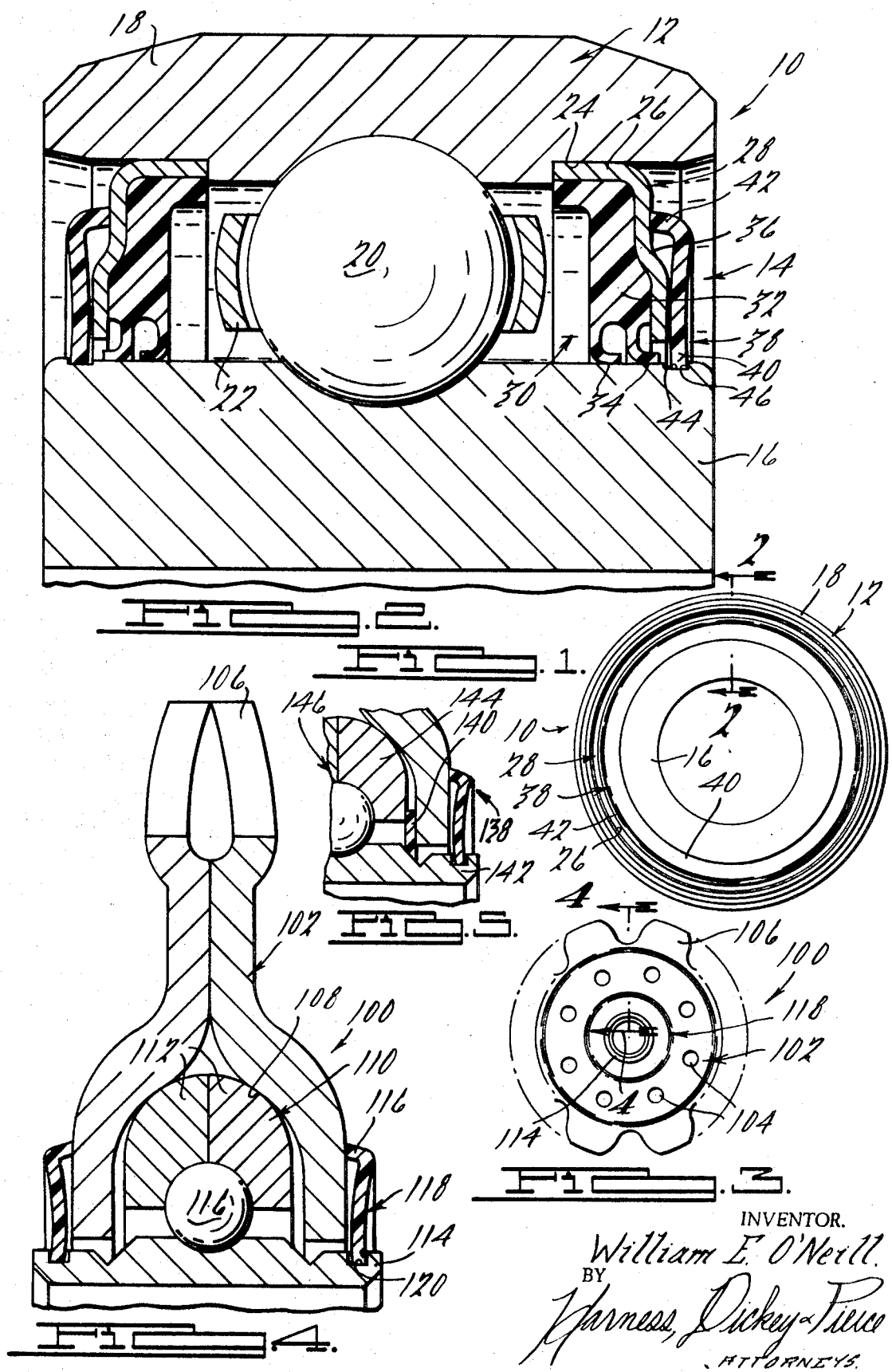

SEAL AND BEARING ASSEMBLY

SUMMARY BACKGROUND OF THE INVENTION

The present invention relates to bearings and more particularly to a combination bearing and seal assembly.

In applications where bearings are exposed to dust and dirt, such as with farm equipment and the like, it is difficult to properly seal the interior of the bearing whereby the dust and dirt are kept out. Conventional grease seals, for maintaining lubricant in, are not normally effective in keeping the dirt out. One approach in the past has been to use a separate dirt or dust seal in addition to the grease seal; these dust seals, however, had certain defects in that they had poor abrasive resistance and eventually would be worn to the point of ineffectiveness. These problems are minimized by the present invention in which a unique construction is utilized which has good abrasive resistance and provides an effective seal. With this construction it is possible in some applications to eliminate the grease seal and use only the outer seal as a grease and dirt seal. Therefore, it is a general object of the present invention to provide a new and improved bearing and seal assembly.

It is another object to provide a novel bearing assembly including a new and improved dirt and dust seal.

Other objects, features, and advantages of the present invention will become apparent from the subsequent description and the appended claims, taken in conjunction with the accompanying drawings, in which:

FIG. 1 is a fragmentary side elevational view of a bearing assembly, for a disc harrow, depicting one form of the invention;

FIG. 2 is a sectional view to enlarged scale taken substantially along the lines 2-2 in FIG. 1;

FIG. 3 is a fragmentary side elevational view of a bearing and sprocket assembly, for a corn picker, depicting another form of the invention;

FIG. 4 is a sectional view to enlarged scale taken substantially along the lines 4-4 in FIG. 3; and FIG. 5 is a view similar to FIG. 4 of a modified form of the invention.

Looking now to the drawings a bearing assembly 10 includes a ball bearing assembly 12 and a seal assembly 14. The ball bearing assembly 12 includes inner and outer rings 16 and 18, respectively, and a plurality of ball members 20 held by a retainer 22. A counterbore 24 is formed in the outer race 18 and matingly receives a radially outer, axially extending flange portion 26 of a seal support member 28 of a double lip grease seal 30. The support 28 is of a one piece construction and has a radially inwardly extending portion 36 which terminates proximate the inner ring 16.

The seal 30 includes a resilient sealing member 32 secured to the inner surfaces of the portions 26 and 36 of the support 28. The radially inner end of the member 32 terminates in a pair of annular resilient sealing lips 34 which engage the inner ring 16 to provide a seal therewith.

The seal 30 is effective to maintain lubricant within the ball bearing assembly 12, However, for operation under severe dirt and dust (as for a disc harrow) conditions the seal 30 could eventually deteriorate and dirt would enter the ball bearing assembly 12. This latter event is minimized by the use of an improved outer seal 38. Seal 38 is generally cup-shaped and has a radially extending portion 40 which terminates at its radially outer end in an annular ring portion 42. The portion 40 is sealingly held within an annular groove 44 in the inner ring 16 to seal the inner ring 16. With portion 40 in groove 44 the ring portion 42 is held in sealing engagement with the outer surface of support portion 36. Note that the axially outer end 46 of groove 44 is located relative to the support portion 36 so that the radial seal portion 40 is dished inwardly to provide an axial force on ring portion 42 whereby its sealing end surface is held against support portion 36 to provide an effective seal.

The seal 38 has a resilient structure and is made of a hard, wear-resistant plastic material having the property of providing high lubricity and can be of a material such as nylon, Teflon (polytetrafluoroethylene) or Delrin (acetal resin plastic).

With the use of the outer seal 38 the inner (or grease) seal 30 can be made of a more simple construction and hence can be of a single or double lip construction whereas without the improvement of the present invention a triple lip seal conventionally has been required.

As previously noted, a seal such as the seal 38 can be used alone, i.e., no inner, grease seal; this is shown in FIGS. 3 and 4 which depict a sprocket idler assembly 100 (for use with a corn picker). The assembly 100 includes an outer sprocket shell 102 which is constructed of two identical half shells secured together as by rivets 104. The sprocket shell 102 terminates at its radially outer extremity in teeth 106 adapted to engage a chain and in a hollow arcuate cavity 108 at its radially inner end. Bearing assembly 110 is fixed to the shell 102 and includes a two-piece outer race 112 matingly held within cavity 108. An inner race is defined by a cylindrical sleeve 114 adapted to be supported upon a shaft and a plurality of ball members 116 are located between races 112 and 114. A seal 118, similar to seal 38 in FIGS. 1 and 2, is held in a groove 120 in race 114 and has an outer sealing ring portion 116 which engages the outer surface of the sprocket shell 102. Note that the groove 120 is located relative to the outer sprocket surface such as to provide a dishing of the seal 118 whereby the sealing ring portion 116 is held in resilient engagement with the sprocket shell 102 to provide a good seal.

For applications where an inner seal could be desirable, a single grease seal can be added. Thus in FIG. 5, for a sprocket idler assembly 138 similar to assembly 100 of FIGS. 3 and 4, an inner grease seal 140 can be applied between the inner and outer races 142 and 144 of bearing assembly 146.

One problem with prior outer seals or shields has been their ineffectiveness in keeping fibrous materials out of the confines of the bearing assembly. This has been because in the past there has been a slight gap at the outer extremity of the seal or shield through which fibrous materials could enter as they were wrapped around the seal or shield during rotation of the bearing. These fibrous materials, once past the outer shield or seal, could readily pass through the grease seal resulting in damage or destruction of the bearing. With the seals 38 and 118 of the present invention the sealing surfaces of ring portions 42 and 116, respectively, are flush and provide no gaps through which fibrous materials can enter. In addition, the ring portions 42 and 116 angle slightly radially inwardly away from the bearing assembly whereby fibrous materials tend to be thrown away from the seals 38 and 118.

While it will be apparent that the preferred embodiment of the invention disclosed is well calculated to fulfill the objects above stated, it will be appreciated that the invention is susceptible to modification, variation and change without departing from the proper scope or fair meaning of the invention.

What I claim is:

1. A bearing assembly comprising: inner and outer race members and a plurality of antifriction members located therebetween, a generally cup-shaped, plastic seal, with the cup shape being inwardly directed towards said antifriction members, said plastic seal comprising a radially extending support portion and a ring portion extending axially from one extremity of said support portion, first and second surfaces associated with said inner and outer members said support portion engageable with said first surface said first surface being on said inner race member and said ring portion having its terminating end engageable with said second surface whereby a seal is provided for the confines of the bearing assembly, said support portion and said ring portion having their sealing surfaces constructed such that the assembly includes a means for defining an interference fit between said first and second surfaces whereby said sealing surfaces are resiliently held against said first and second surfaces, said terminating end as engaged with said second surface having substantially no clearance at its radially outer extremity, said outer radial surfaces of said ring portion being inclined radially inwardly, axially away from said bearing assembly, said seal being constructed of a hard, wear resistant plastic having the property of providing high lubricity, said assembly further comprising a second, inner seal located between said inner and outer races, said inner seal including means for providing a seal between said inner and outer races to maintain lubricant within the confines of the bearing assembly.

2. A bearing assembly comprising: inner and outer race members and a plurality of antifriction members located therebetween, a generally cup-shaped, plastic seal, with the cup shape being inwardly directed towards said antifriction members, said plastic seal comprising a radially extending support portion and a ring portion extending axially from one extremity of said support portion, first and second surfaces associated with said inner and outer members said support portion engageable with said first surface and said ring portion having its terminating end engageable with said second surface whereby a seal is provided for the confines of the bearing assembly, said support portion and said ring portion having their sealing surfaces constructed such that the assembly includes means for defining an interference fit between said first and second surfaces whereby said sealing surfaces are resiliently held against said first and second surfaces, said terminating end as engaged with said second surface having substantially no clearance at its radially outer extremity, said outer radial surfaces of said ring portion being inclined radially inwardly, axially away from said bearing assembly, said seal being constructed of a hard, wear resistant plastic having the property of providing high lubricity, said assembly further comprising a second, inner seal located between said inner and outer races, said second inner seal including means for providing a seal between said inner and outer races to maintain lubricant within the confines of the bearing assembly, and, said inner seal comprising a resilient sealing member and a stiff support member, said second surface being defined by a surface on said support member.

3. The assembly of claim 2 with part of the support portion being located in an annular groove in that one of said inner and outer races with which it is associated, said first surface being a part of said groove, 4. The assembly of claim 3 with the outer radial surfaces of said ring portion being inclined radially inwardly, axially away from said bearing assembly.

5. The bearing assembly of claim 4 with said antifriction members being ball members and with said support member supported on said outer race and with said groove being in said inner race.